(12) United States Patent
Dogiamis et al.

(10) Patent No.: US 11,437,693 B2
(45) Date of Patent: Sep. 6, 2022

(54) MMWAVE WAVEGUIDES FEATURING POWER-OVER-WAVEGUIDE TECHNOLOGY FOR AUTOMOTIVE APPLICATIONS

(71) Applicant: Intel Corporation, Santa Clara, CA (US)

(72) Inventors: Georgios C. Dogiamis, Chandler, AZ (US); Sasha N. Oster, Marion, IA (US); Telesphor Kamgaing, Chandler, AZ (US); Kenneth Shoemaker, Los Altos Hills, CA (US); Erich N. Ewy, Phoenix, AZ (US); Adel A. Elsherbini, Chandler, AZ (US); Johanna M. Swan, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 127 days.

(21) Appl. No.: 16/764,600

(22) PCT Filed: Dec. 30, 2017

(86) PCT No.: PCT/US2017/069156
§ 371 (c)(1),
(2) Date: May 15, 2020

(87) PCT Pub. No.: WO2019/133018
PCT Pub. Date: Jul. 4, 2019

(65) Prior Publication Data
US 2020/0388898 A1 Dec. 10, 2020

(51) Int. Cl.
*H01P 3/16* (2006.01)
*H04B 3/54* (2006.01)
(52) U.S. Cl.
CPC .............. *H01P 3/16* (2013.01); *H01P 3/165* (2013.01); *H04B 3/548* (2013.01)

(58) Field of Classification Search
CPC .... H01P 3/16; H01P 3/122; H01P 3/14; H01P 3/165; H01P 3/127; H04B 3/548; H04B 3/54; H04L 12/10
See application file for complete search history.

(56) References Cited

U.S. PATENT DOCUMENTS 9,373,878 B2 6/2016 Schuppener et al.
2007/0001789 A1 1/2007 Suarez-Gartner et al.
(Continued)

FOREIGN PATENT DOCUMENTS

WO WO 2017-1888317 A1 11/2017

OTHER PUBLICATIONS

AlphaWire, "Understanding Shielded Cable", 2009, retrieved from https://www.mouser.com/pdfdocs/alphawire-Understanding-Shielded-Cable.pdf on Nov. 11, 2021 (Year: 2009).*
(Continued)

*Primary Examiner* — Ryan Johnson
(74) *Attorney, Agent, or Firm* — Schwabe, Williamson & Wyatt, P.C.

(57) ABSTRACT

Embodiments include a waveguide bundle, a dielectric waveguide, and a vehicle. The waveguide bundle includes dielectric waveguides, where each dielectric waveguide has a dielectric core and a conductive coating around the dielectric core. The waveguide bundle also has a power delivery layer formed around the dielectric waveguides, and an insulating jacket enclosing the waveguide bundle. The waveguide bundle may also include the power deliver layer as a braided shield, where the braided shield provides at least one of a DC and an AC power line. The waveguide bundle may further have one of the dielectric waveguides provide a DC ground over their conductive coatings, where the AC power line does not use the braided shield as reference or ground. The waveguide bundle may include that the power
(Continued)

delivery layer is separated from the dielectric waveguides by a braided shield, where the power delivery layer is a power delivery braided foil.

35 Claims, 7 Drawing Sheets

(56) References Cited

U.S. PATENT DOCUMENTS

| | | | |
|---|---|---|---|
| 2014/0368301 A1 | 12/2014 | Herbsommer et al. | |
| 2016/0240907 A1* | 8/2016 | Haroun | H01Q 1/3233 |
| 2016/0365175 A1* | 12/2016 | Bennett | H01B 11/1808 |
| 2017/0170538 A1* | 6/2017 | Morgan | H01P 3/16 |

OTHER PUBLICATIONS

International Search Report and Written Opinion dated Sep. 20, 2018 for International Patent Application No. PCT/US2017/069156, 15 pages.

* cited by examiner

MMWAVE WAVEGUIDES FEATURING POWER-OVER-WAVEGUIDE TECHNOLOGY FOR AUTOMOTIVE APPLICATIONS

CROSS REFERENCE TO RELATED APPLICATIONS

The present application is a national phase entry under 35 U.S.C. § 371 of International Application No. PCT/US2017/069156, filed Dec. 30, 2017, entitled "MMWAVE WAVEGUIDES FEATURING POWER-OVER-WAVEGUIDE TECHNOLOGY FOR AUTOMOTIVE APPLICATIONS", which designated, among the various States, the United States of America. The Specifications of the PCT/US2017/069156 Application is hereby incorporated by reference.

FIELD OF THE INVENTION

Embodiments of the invention are in the field of semiconductor packaging and, in particular, formation of mmwave interconnects for use in automotive applications.

BACKGROUND OF THE INVENTION

The automotive industry is rapidly progressing towards the production of autonomous and/or self-driving vehicles. Autonomous vehicles utilize many sensors that generate data regarding the position of the vehicle relative to surrounding objects, such as the road, other cars, traffic signals, lane markings, pedestrians, and the like. As illustrated in FIG. 1, a vehicle 100 may include any number of sensors 102, video cameras 103, and positioning systems 104, such as global positioning systems (GPS). For example, sensors 102 may include video sensors, image sensors, ultrasonic sensors, radar sensors, light detection and ranging (LIDAR) sensors, or the like. The data generated from these components needs to be processed in order to determine how the vehicle needs to react. As such, the generated data is transferred from the peripheral components to an electronic control unit (ECU) 105 over one or more interconnects. Accordingly, the additional peripheral sensors and other components needed for autonomous and/or self-driving vehicle results in a significant increase in the amount of data that is transferred within the vehicle.

Currently, autonomous vehicles that are being tested utilize data-transfers at rates between approximately 1.0 Gbps and 1.5 Gbps and employ four different low-voltage differential signaling (LVDS) lanes to allow for a total data rate between approximately 4.0 Gbps and 6.0 Gbps. However, the data rate needed in the subsequent generations of autonomous vehicles is expected to increase to approximately 10 Gbps or more (i.e., approximately 2.5 Gbps using four differential LVDS lanes). This increase in the data rate far exceeds the data rate of existing systems in currently available vehicles. For example, the standard for multimedia and infotainment networking in vehicles i.e., media oriented systems transport bus (MOST) has a data transfer rate of 150 Mbps.

Some solutions for providing high-speed interconnects include electrical interconnects and optical interconnects. However, both suffer significant drawbacks when used in the automotive industry. Electrical connections, such as ethernet, may be utilized by employing multiple lanes (i.e., cables) to reach the required bandwidth. However, this becomes increasingly expensive and power hungry to support the required data rates for short to intermediate (e.g., 5 m-10 m) interconnects needed in the automotive industry. For example, to extend the length of a cable or the given bandwidth on a cable, higher quality cables may need to be used or advanced equalization, modulation, and/or data correction techniques employed. Unfortunately, these solutions require additional power and increase the latency of the system. Latency increases are particularly problematic in autonomous vehicles due to the need to make rapid decisions (e.g., braking, avoidance maneuvers, drive train corrections, etc.) needed to ensure the safety of passengers within the vehicle and/or persons and/or property external to the vehicle.

Optical transmission over fiber is capable of supporting the required data rates and distances needed for autonomous and/or self-driving vehicles. However, the use of optical connections results in a severe power and cost penalty, especially for short to medium distances (e.g., 5 m-10 m) because of the need for conversion between optical and electrical signals. Furthermore, the alignment of optical interconnects needs to be precisely maintained. This proves to be difficult in automotive applications due to vibrations and other environmental conditions that may alter the alignment of the optical interconnects, and therefore, reduces the reliability of optical interconnects.

Accordingly, both technologies (traditional electrical and optical) are not optimal for autonomous and/or self-driving vehicles that require high data-rate, low latency, and low power interconnect lines between peripheral sensors and the ECU.

DETAILED DESCRIPTION OF THE INVENTION

Figure 1:
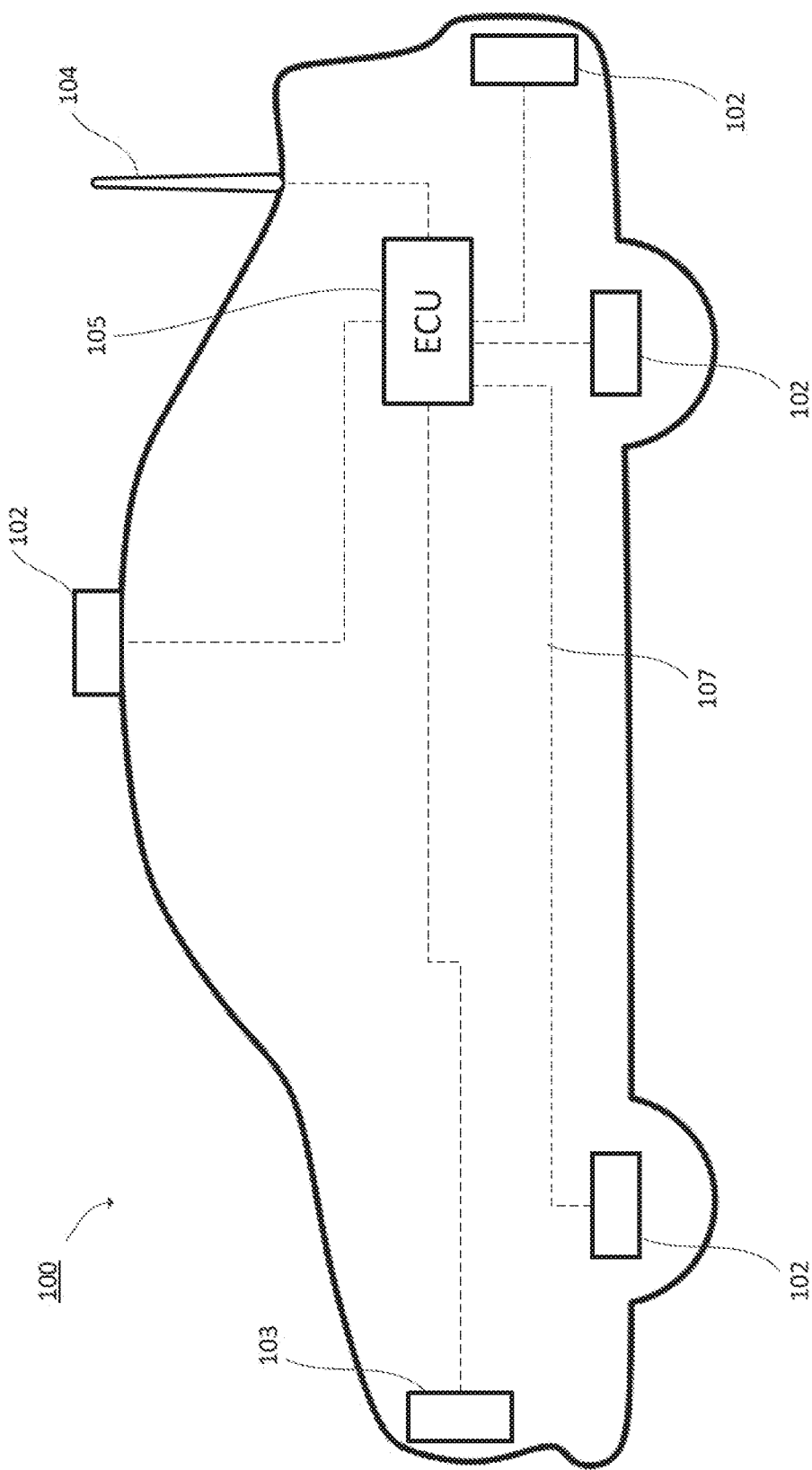
FIG. 1 is a schematic of an automobile that includes a plurality of sensors and other peripheral components that are communicatively linked to an electronic control unit (ECU.

Described herein are systems that include mm-wave interconnects with power over waveguide technology that are used in autonomous and/or self-driving vehicles, according to embodiments of the invention. In the following description, various aspects of the illustrative implementations will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative implementations. However, it will be apparent to one skilled in the art that the present invention may be practiced without the specific details. In other instances, well-known features are omitted or simplified in order not to obscure the illustrative implementations.

Various operations will be described as multiple discrete operations, in turn, in a manner that is most helpful in understanding the present invention, however, the order of description should not be construed to imply that these operations are necessarily order dependent. In particular, these operations need not be performed in the order of presentation.

As noted above, currently available interconnect solutions (i.e., electrical cables and optical cables) do not satisfy data rate, power consumption, latency, and cost targets needed for autonomous and/or self-driving vehicles (e.g., cars, trucks, trains, boats, planes, and any other autonomous transportation/cargo vehicle). Accordingly, embodiments of the invention include millimeter-wave waveguide (mm-wave waveguide) interconnect solutions. In an embodiment, the mm-wave waveguide comprises a dielectric waveguide bundle that is made out of low loss coated or uncoated dielectric materials designed to operate in the mm-wave or sub-THz frequency range. The waveguides may be coupled at both ends to a package that includes a mm-wave engine. In short to medium length cables (e.g., 0.5-15 meters or greater), the mm-waveguide cables provide a low power, low latency, high-speed, and low cost solution. Particularly, since signals do not need to be up-converted to an optical signal, the power consumption is significantly lower than the power consumption of the alternative optical fiber interconnect technology. Additionally, in the short to medium length cables, there may be no need for error correction (EC), since achieved bit-error-rate level rates are very low (below 10E–12). Therefore, the achieved latency may be significantly lower compared to the traditional electrical interconnect especially at high datarates, where EC is needed.

However, one drawback for conventional dielectric waveguide interconnects is that there is currently no power delivery mechanism. This is particularly problematic in autonomous vehicle applications where a plurality of sensors are distributed throughout the vehicle, as described above. As such, power still needs to be delivered to the sensors with electrical cables. This increases the complexity of the wiring, increases the overall weight due to heavy electrical cables, and limits aftermarket modifications (e.g., adding new sensors). Therefore, embodiments of the invention include dielectric waveguides and dielectric waveguide bundles that include power delivery mechanisms.

In some embodiments, existing components of the dielectric waveguide may be utilized for power delivery. For example, conductive platings or foils formed around the dielectric waveguide may be used to deliver power. Additional embodiments may include dedicated power delivery braided foils or foils that are wrapped around a bundle of dielectric waveguides. In some embodiments, a jacketed conductor may be added to the dielectric waveguide bundle to allow for even higher power/current delivery. While an additional conductor may be added, the overall weight is still reduced compared to using separate power delivery interconnects. In yet another embodiment, a conductive line may be integrated directly into the dielectric waveguide.

Figure 2:
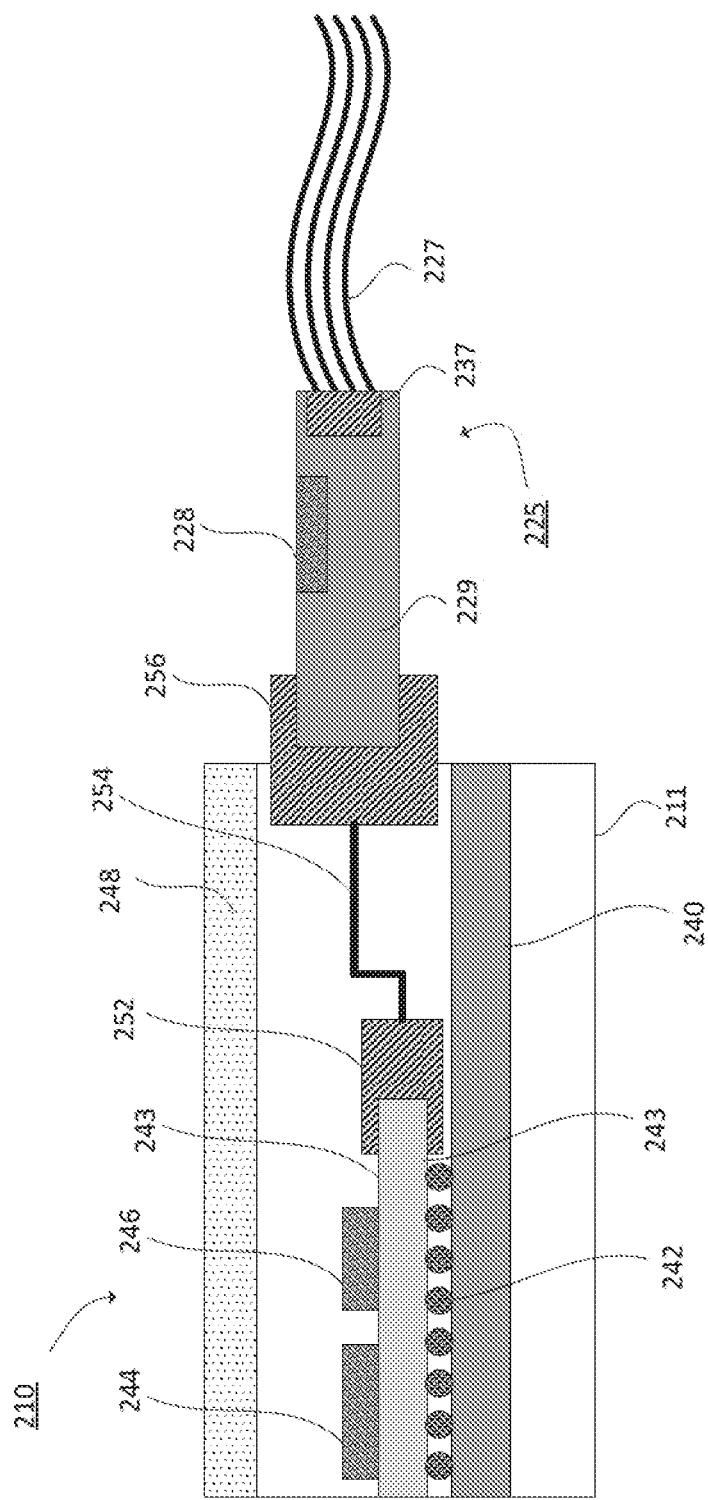
FIG. 2 is a cross-sectional illustration of a dielectric waveguide bundle with power over waveguide technology that is plugged into an ECU, according to an embodiment of the invention.

Referring now to FIG. 2, a cross-sectional illustration of a bundle of dielectric waveguides 227 connected to an ECU 210 by a connector 225 is shown, according to an embodiment of the invention. In an embodiment, the ECU 210 is a central hub to which the sensors (not shown) in a vehicle are connected. In an embodiment, the ECU 210 is also the source of power that is provided to the sensors. For example, the power may be delivered to the sensors over one or more of the dielectric waveguides 227 or through a conductive component (e.g., a foil, a shield, an insulated conductive wire, etc.) that is integrated with the bundle of dielectric waveguides 227. In FIG. 2, the dielectric waveguides 227 are represented as individual lines, but it is to be appreciated that each dielectric waveguide (or a bundle of dielectric waveguides) may include additional components that will be described in greater detail below.

In an embodiment, the ECU 210 may include a central processing unit (CPU) die 244 that is packaged on a packaging substrate 243. The packaging substrate 243 may be coupled to an ECU printed circuit board (PCB) 240 by solder bumps 242, such as a ball grid array (BGA), a land grid array (LGA), a socket, or any other known interconnect. In some embodiments a heatsink 248 or any other thermal management technology may also be included in the ECU 210. For example, the heatsink 248 may be a liquid cooled heatsink 248, such as one that is connected to the cooling systems in the autonomous vehicle. In the illustrated embodiment, the heatsink 248 is formed over a surface of an ECU enclosure 211. However, the heatsink 248 may be within the ECU enclosure 211 in some embodiments of the invention.

Embodiments of the invention may include a predefined interface 252 that couples the CPU packaging substrate 243 to a first end of an internal cable 254. The internal cable 254 may be any suitable electrical cable, such as a twinaxial cable, or the like. The internal cable 254 may extend to the edge of the ECU enclosure 211 where it is coupled to an external predefined interface 256. The external predefined interface 256 may be any suitable interface. For example, the external predefined interface 256 may be a SFP, a QSFP, or the like.

According to an embodiment of the invention, a connector 225 may be plugged into the external predefined interface 256 of the ECU 210. The connector 225 may include a mm-wave engine 228 placed on a connector substrate 229. While it may be beneficial to have the mm-wave engine 228 external to the ECU in order to provide plug and play functionality, in some embodiments the mm-wave engine 228 may also be integrated within the ECU. In such embodiments, the mm-wave engine 228 may still be packaged on a different packaging substrate than the CPU packaging substrate 243. Alternatively, the mm-wave engine 228 may be packaged on the same packaging substrate 243 as the CPU 244. In some embodiments, a predefined digital interconnect interface die 246 electrically coupled between CPU die 244 and the mm-wave engine 228 may also be packaged on the same packaging substrate 243 on which the CPU die 244 is packaged. For example, the predefined digital interconnect interface die 246 may translate and/or condition a signal so that signals may pass between the CPU die 244 and the mm-wave engine 228 of the active mm-wave interconnect 220 even when the output of either of the CPU die 244 or the mm-wave engine 228 does not match the type of input expected by the other component.

In the illustrated embodiment, the connector 225 is shown without a protective enclosure in order to not obscure the Figure. However, it is to be appreciated that the connector 225 may include multiple different packaging substrates, protective enclosures, heat management solutions, and other needed components. For example, the mm-wave engine 228 may be packaged on a packaging substrate 229 and may be substantially enclosed by a protective casing. Furthermore, while the mm-wave engine 228 is illustrated as a single block, it is to be appreciated that the mm-wave engine 228 may include any number of discrete dies, interconnects, and/or other components.

In an embodiment the connector 225 may include a launcher 237 that is used to launch and assist the propagation of the mm-wave signal along the dielectric waveguide 227 or a bundle of dielectric waveguides 227. In some embodiments, the launcher 237 may be integrated with a waveguide connector that mechanically and communicatively couples the dielectric waveguide 227 to the launcher 237. The launcher 237 may be any known launcher for initiating the propagation of mm-waves or receiving mm-waves, such as single patch launcher, a stacked-patch launcher, a microstrip-to-tapered slot transition launcher, etc.

In FIG. 2 only a single end of the dielectric waveguides 227 are shown in order to not obscure the Figure. However, it is to be appreciated that the opposite ends of the dielectric waveguides 227 are coupled to a connector similar to the connector 225. The second connector may then be plugged into a sensor or other component.

Figure 3A:
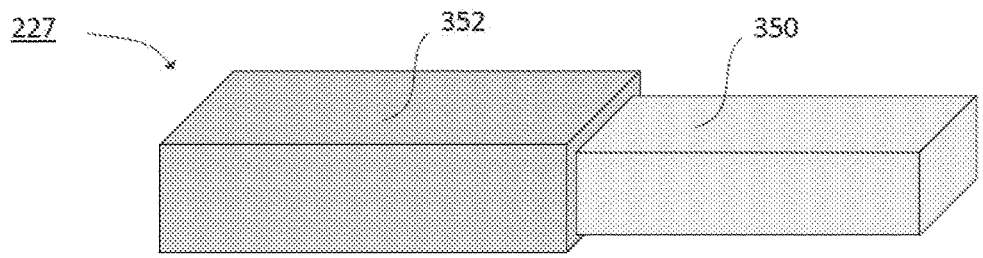
FIG. 3A is a perspective view of a dielectric waveguide with a conductive coating, according to an embodiment of the invention.

Referring now to FIGS. 3A-3D, perspective views of individual dielectric waveguides are shown in greater detail, according to various embodiments of the invention. In FIG. 3A, a dielectric waveguide 227 with a conductive plating 352 and a dielectric core 350 is shown, according to an embodiment of the invention. In an embodiment, the dielectric waveguide 227 is suitable for propagating mm-wave signals, and may include a dielectric core 350 that is any suitable dielectric material, such as liquid crystal polymer (LCP), low-temperature co-fired ceramic (LTCC), glass, polytetrafluoroethylene (PTFE), expanded PTFE, low-density PTFE, ethylene tetrafluoroethylene (ETFE), fluorinated ethylene propylene (FEP), polyether ether ketone (PEEK), perfluoroalkoxy alkanes (PFA), combinations thereof, or the like. In FIG. 3A, the dielectric core 350 is illustrated as a single material. However, it is to be appreciated that the dielectric core may include multiple dielectric materials. For example, In FIG. 3D the dielectric core 350 may include a first dielectric material 351 and a second dielectric material 353 surrounding the first dielectric material 351. In an embodiment, the dielectric waveguides may have any shaped cross section, including, but not limited to, rectangular (with or without rounded corners), square, circular, oval, among others.

In an embodiment, the dielectric waveguides 227 may also include a conductive plating 352. Typically, such conductive platings 352 provide electrical shielding to the dielectric core 350 by being utilized as an RF-ground. However, in addition to providing electrical shielding, embodiments include using the conductive plating 352 as a power line for DC power delivery and/or AC power delivery (or DC/AC power deliver lines), but note that the AC power delivery line does not use the braided shield (or waveguide shield) as reference or ground, according to one embodiment. In such an embodiment, the ground reference needed for the sensors may be provided as a common ground through the chassis of the vehicle. According to an embodiment, the conductive plating 352 may be any suitable conductive material. For example, the conductive plating may be copper, aluminum, alloys including conductive materials, or the like. Furthermore, the thickness of the plating may be any desired thickness. For example, the thickness may be between a 1 μm and several millimeters thick. In an embodiment, the conductive plating 352 may be formed over the dielectric core with a plating process (e.g., electroless or electrolytic plating), printing, deposition, or the like. Furthermore, in some embodiments, the conductive plating 352 may be a shell without material filling the interior of the shell. In such embodiments, the dielectric core 350 may be air.

Figure 3B:
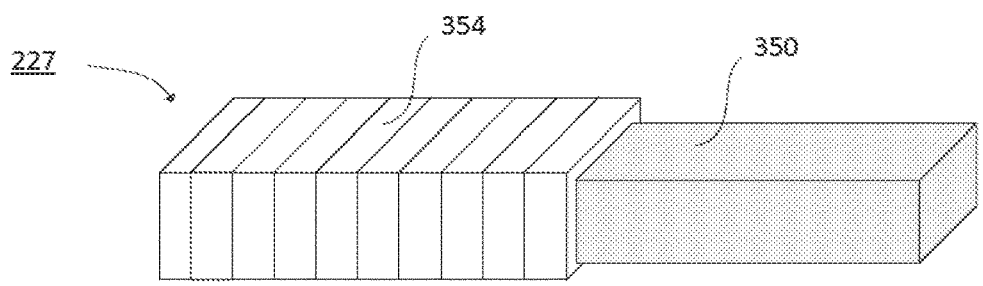
FIG. 3B is a perspective view of a dielectric waveguide with a foil wrapping, according to an embodiment of the invention.

Referring now to FIG. 3B, a dielectric waveguide 227 with a foil wrapping 354 and a dielectric core 350 is shown, according to an embodiment of the invention. In an embodiment, the dielectric core 350 is substantially similar to the dielectric core 350 described above with respect to FIG. 3A. Instead of having a conductive plating 352 surrounding the dielectric core 350, the dielectric waveguide 227 may include a foil wrapping 354. For example, the foil wrapping may be a conductive material. In the illustrated embodiment, the foil wrapping 354 is wrapped many times around the perimeter of the dielectric core 350. In order to ensure complete coverage of the dielectric core 350, the foil wrapping 354 may overlap itself as it is wrapped around the dielectric core 350. In alternative embodiments, the foil wrapping may also be wrapped along the length of the dielectric core 350 (e.g., wrapping the foil along the length of the dielectric core may be similar to how a cigarette wrapper is wrapped around tobacco).

In the illustrated embodiment, the foil wrapping 354 is illustrated as a single material layer. However, it is to be appreciated that the foil wrapping 354 may be include two or more layers. For example, the foil wrapping 354 may include a stack including a polymer layer and a metal layer over the polymer layer, a stack including a first polymer layer, a metal layer over the first polymer layer, and a second polymer layer over the metal layer, or a stack including a first metal layer, a polymer layer over the first metal layer, and a second metal layer over the polymer layer. Similarly, the foil wrapping 354 may include stacks that include any number of polymer and metal layers. In addition to providing electrical shielding, embodiments include using the foil wrapping 354 as a power line for DC power delivery. In such an embodiment, the ground reference needed for the sensors may be provided as a common ground through the chassis of the vehicle.

Figure 3C:
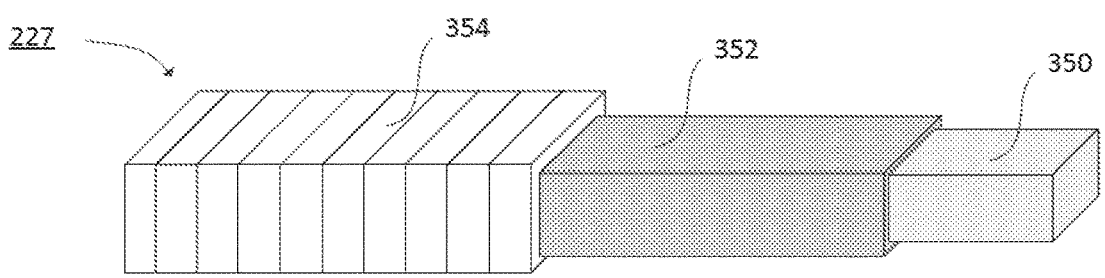
FIG. 3C is a perspective view of a dielectric waveguide with a conductive coating and a foil wrapping, according to an embodiment of the invention.

Referring now to FIG. 3C, a dielectric waveguide 227 with a conductive plating 352 and a foil wrapping 354 surrounding a dielectric core 350 is shown, according to an embodiment of the invention. In an embodiment, the dielectric core 350 is substantially similar to the dielectric core 350 described above with respect to FIG. 3A. The foil wrapping 354 may be substantially similar to the foil wrapping described above with respect to FIG. 3A, with the exception that the foil wrapping 354 is separated from the dielectric core 350 by the conductive plating 352. In such embodiments, power lines for DC power delivery may be made along the conductive plating 352 and/or the foil wrapping 354.

Figure 3D:
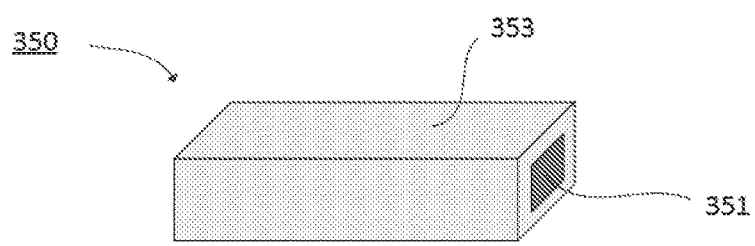
FIG. 3D is a perspective view of a dielectric waveguide that includes a first dielectric material and a second dielectric material, according to an embodiment of the invention.

Referring now to FIG. 3D, the dielectric core 350 may include a first dielectric material 351 and a second dielectric material 353 surrounding the first dielectric material 351. Note that, as compared to FIG. 3A where the dielectric core 350 is illustrated as a single material, it is to be appreciated that the dielectric core 350 may include multiple dielectric materials 351 and 353.

As noted above, in order to meet the data transfer rates required for autonomous vehicles, it may be necessary to include a plurality of dielectric waveguides 227 that are bundled together. For example, if a single dielectric waveguide can support 4 Gbps over a 10 meter length and the desired target is 12 Gbps over a 10 meter length, then three dielectric waveguides may be bundled together to provide the desired data transfer rate. The use of bundled dielectric waveguides provides additional structures through which power may be supplied.

Figure 4A:
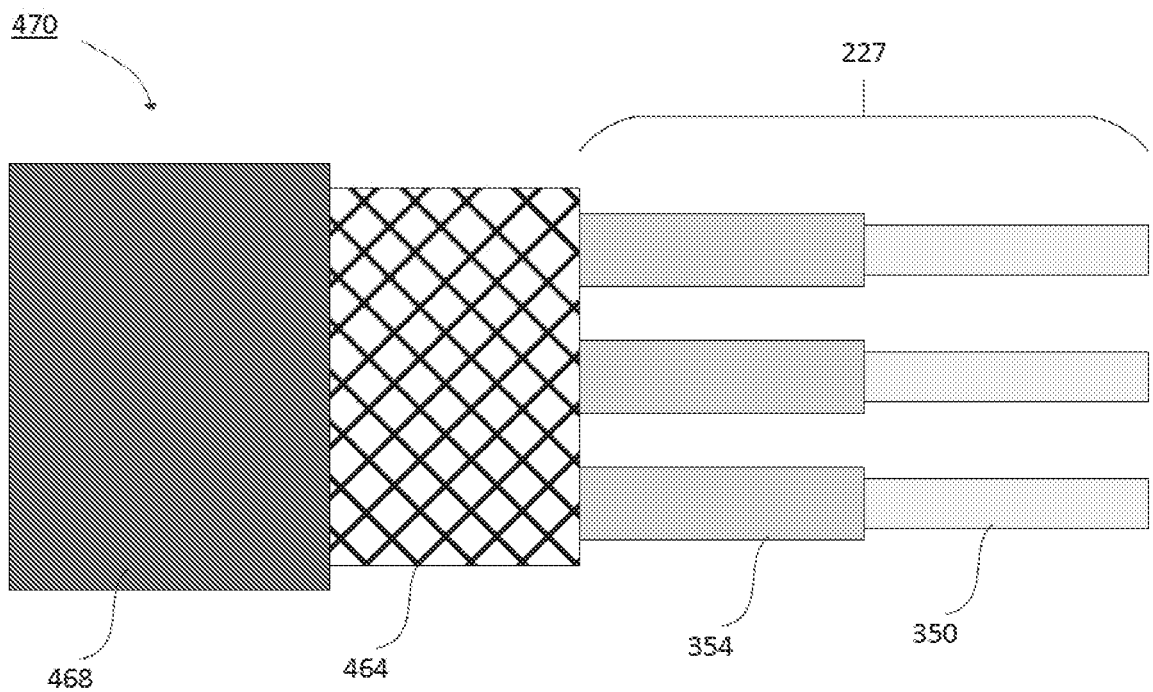
FIG. 4A is a cross-sectional illustration of a dielectric waveguide bundle that includes a plurality of dielectric waveguides with a braided shield and a jacket surrounding the dielectric waveguides, according to an embodiment of the invention.

Referring now to FIG. 4A, a cross-sectional illustration of a dielectric waveguide bundle 470 is shown, according to an embodiment of the invention. In the illustrated embodiment, three dielectric waveguides 227 are shown, though it is to be appreciated that waveguide bundle 470 may include any number of dielectric waveguides 227 to provide the desired data transfer rates. In an embodiment, each of the dielectric waveguides 227 may include a dielectric core 350 that is wrapped with a foil wrapping 354. While only a foil wrapping 354 is shown, it is to be appreciated that a conductive coating may also be included over the dielectric cores 350 similar to the dielectric waveguide 227 illustrated in FIG. 3C, or the foil wrapping 354 may be replaced with a conductive coating, similar to the dielectric waveguide 227 illustrated in FIG. 3A. In some instances, the dielectric waveguides 227 may be separately coated by an insulating material (e.g., a polymer, a non-conductive foil) in order to electrically isolate them from conductive portions of neighboring dielectric waveguides.

In an embodiment, the dielectric waveguides 227 may be bundled together by a braided shield 464 and an insulating jacket 468. The braided shield 464 may provide physical protection to the dielectric waveguides 227. Furthermore, the braided shield 464 may be used as a power delivery pathway. In some instances, the braided shield 464 may be separated from the dielectric waveguides 227 by an insulating material (e.g., a polymer, a non-conductive foil) in order to electrically isolate the braided shield 464 from conductive portions of the dielectric waveguides.

The use of the braided shield may allow for increased power to be provided along the waveguide bundle 470 compared to providing power along the foil wrappings 354 or the conductive plating. The increased power is able to be accommodated by the braided shield 464 because a braided shield 464 may have a resistance that is between ten and one hundred times lower than the foil wrapping 354 or conductive shields. However, it is to be appreciated that in low-power applications, the foil wrapping or conductive plating may still provide sufficient power.

In some embodiments, power may also be delivered along the braided shield 464 and one or more of the conductive portions of the dielectric waveguides 227. In such embodiments, this may allow for the DC power delivery and a DC ground to be supplied along a single waveguide bundle 470. Additional embodiments may also utilize the multiple conductive pathways to allow power to be delivered at multiple different voltages along a single waveguide bundle 470. As such, sensors that are operating a different voltages may be provided power from a single waveguide bundle without the need for voltage converters or transformers at the sensor.

Figure 4B:
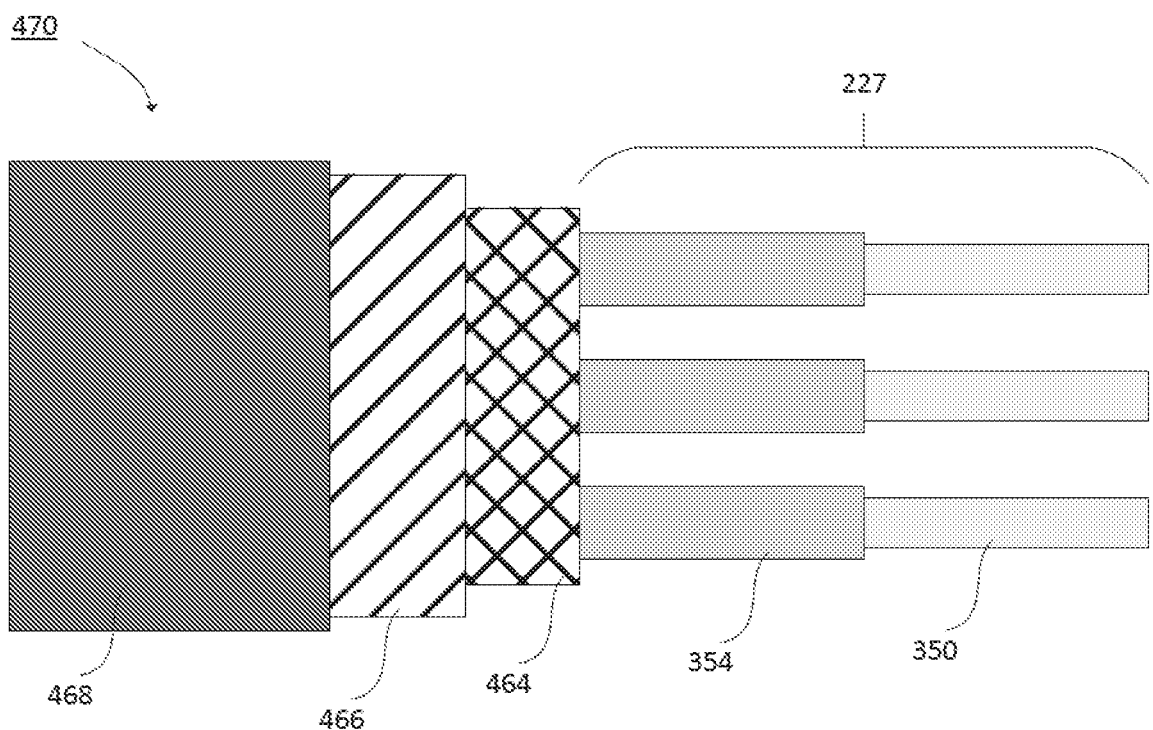
FIG. 4B is a cross-sectional illustration of a dielectric waveguide bundle that includes a plurality of dielectric waveguides with a braided shield, a power delivery braided foil, and a jacket surrounding the dielectric waveguides, according to an embodiment of the invention.

Referring now to FIG. 4B, a cross-sectional illustration of a dielectric waveguide bundle 470 is shown, according to an additional embodiment of the invention. FIG. 4B is substantially similar to FIG. 4A with the exception that a power delivery braided foil 466 is also included around the braided shield 464. While not shown for simplicity, it is to be appreciated that an insulating layer may be formed between the braided shield 464 and the power delivery braided foil 466 in order to electrically isolate the two conductive components. In an embodiment, the power delivery braided foil 466 may be included to provide a low-resistance pathway to enable high-power applications. For example, the power delivery braided foil 466 may be a copper foil or other low resistance material. In such embodiments, the power delivery braided foil 466 may be used to provide the DC power and the braided shield 464 may be used to provide a DC ground.

In an embodiment, the power delivery braided foil 466 may also be sectorized. A sectorized delivery shield 644 may include a plurality of electrically isolated pathways along the length of the waveguide bundle 470. In such embodiments, a plurality of different voltages may be delivered along the single waveguide bundle 470, and enables the use of sensors with different voltage requirements.

Figure 5A:
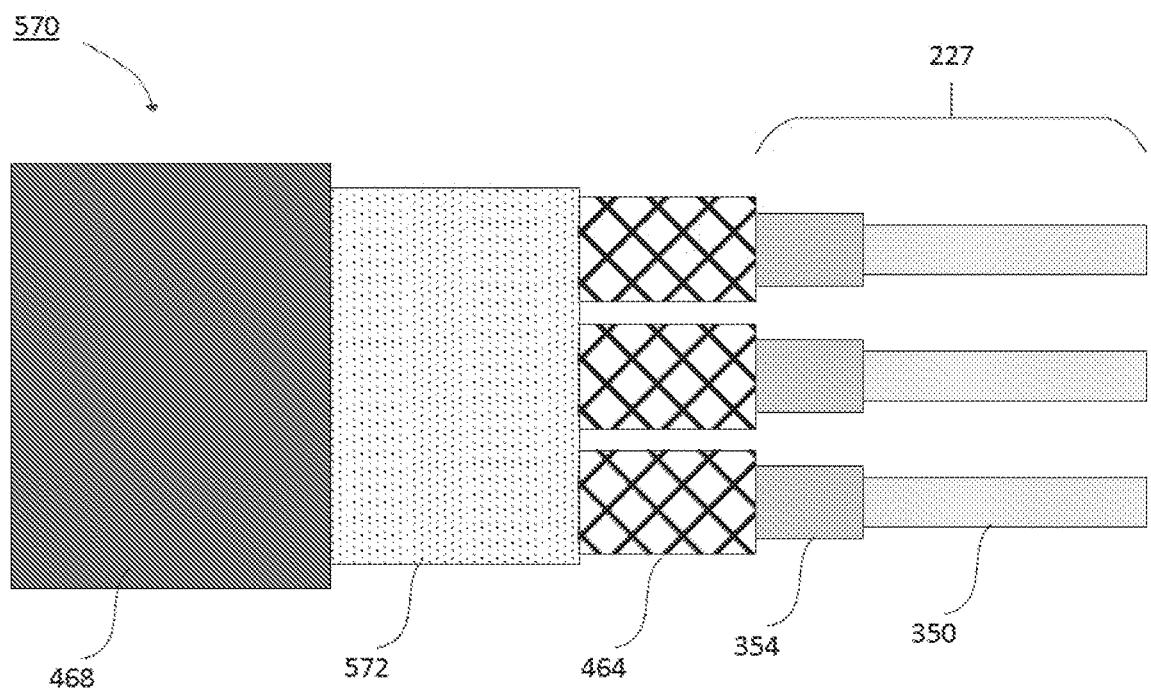
FIG. 5A is a cross-sectional illustration of a dielectric waveguide bundle that includes a plurality of dielectric waveguides that are each surrounded by a braided shield, and further includes a global foil and a jacket, according to an embodiment of the invention.
Figure 5B:
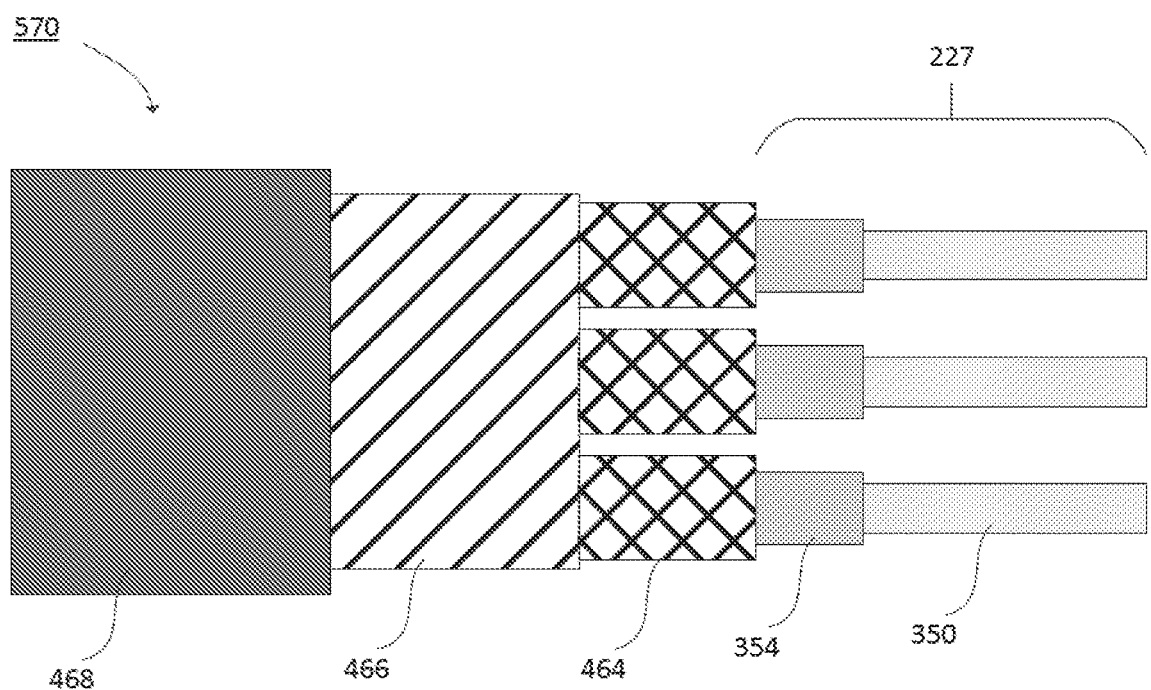
FIG. 5B is a cross-sectional illustration of a dielectric waveguide bundle that includes a plurality of dielectric waveguides that are each surrounded by a braided shield, and further includes a power delivery braided foil and a jacket, according to an embodiment of the invention.

Additional embodiments of the invention may include waveguide bundles where individual braided shields are formed around each dielectric waveguide. Examples of such embodiments are illustrated in FIGS. 5A and 5B. Referring now to FIG. 5A, a cross-sectional illustration of a waveguide bundle 570 with individual braided shields 464 around each dielectric waveguide 227 is shown, according to an embodiment. As illustrated, a plurality of braided shields 464 are shown, with each braided shield 464 being formed around one of the dielectric waveguides 227. Furthermore, embodiments may include a global foil 572 that surrounds all of the braided shields 464. In an embodiment, the global foil 572 may be electrically isolated from the braided shields 464 by an insulating layer (not shown for simplicity). The global foil 572 may be a conductive material that allows for power to be delivered along the waveguide bundle 570. In some instances, the dielectric waveguides 227 may be separately coated by an insulating material (e.g., a polymer, a non-conductive foil) in order to electrically isolate them from conductive portions of neighboring dielectric waveguides.

In an additional embodiment illustrated in FIG. 5B, a power delivery braided foil 466 may be formed around the braided shields 464. The power delivery braided foil 466 may be substantially similar to the power delivery braided foil 466 described above with respect to FIG. 4B. Accordingly, the lower resistance provided by the power delivery braided foil 464 (compared to the global foil) may allow for higher power applications. Additionally, the power delivery braided foil 464 may be sectorized to allow for multiple voltage levels to be supplied along the waveguide bundle 570. In some instances, the dielectric waveguides 227 may be separately coated by an insulating material (e.g., a polymer, a non-conductive foil) in order to electrically isolate them from conductive portions of neighboring dielectric waveguides.

While the embodiments in FIG. 5A and FIG. 5B are shown as distinct examples of the invention, it is to be appreciated that embodiments may include both a global foil 572 and a power delivery braided foil 466. In such embodiments, the global foil may be electrically isolated from the power delivery braided foil 466 by an insulating layer. As such, the power delivery braided foil 466 may be used to supply power and the global foil 472 may be used as the DC ground. Furthermore, embodiments may include using the individual braided shields 354 and/or the foil wrappings/conductive plating 354 as power delivery pathways.

Figure 6:
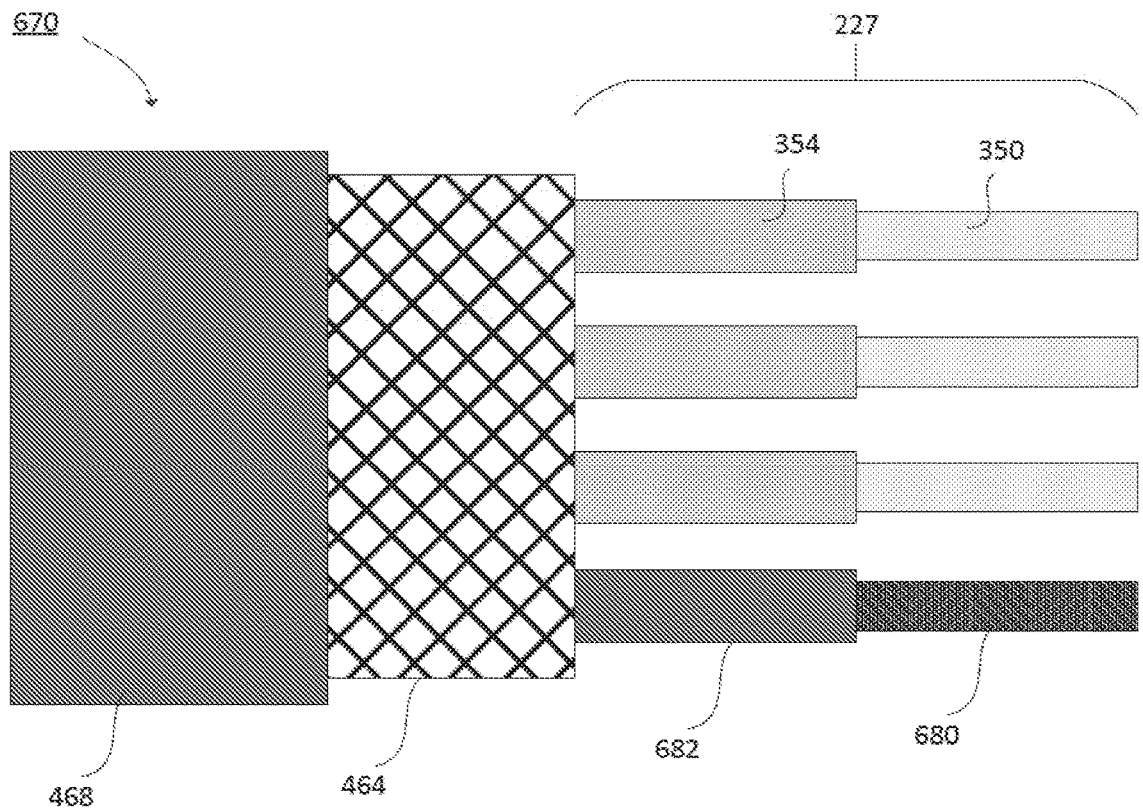
FIG. 6 is a cross-sectional illustration of a dielectric waveguide bundle that includes a plurality of dielectric waveguides and a power delivery line bundled with the dielectric waveguides, according to an embodiment of the invention.

In yet another embodiment, a dedicated power line may be included in the waveguide bundle. Such an embodiment is illustrated in FIG. 6. As shown in FIG. 6, an additional power line 680 is added to the waveguide bundle 670. The power line 680 may be a conductive line, such as a copper wire. The power line 680 may be electrically isolated by an insulating jacket 682. Other than the inclusion of the power line 680 and insulating jacket 682, the waveguide bundle 670 may be substantially similar to other waveguide bundles described herein. The use of such an embodiment has several advantages. One advantage is that a dedicated power line 680 allows for very high power applications due to the low resistance and the ability to choose materials and dimensions that optimize power delivery without consideration for the functionality of data-transfer in the dielectric waveguides 350. Furthermore, a dedicated power line 680 allows for simpler design of the connections to the waveguide bundle 670. Additionally, it is to be appreciated that a single power line 680 may not substantially increase the overall weight of the waveguide bundle 670 since the remaining dielectric waveguides 350 do not require a conductive core/wire.

Figure 7A:
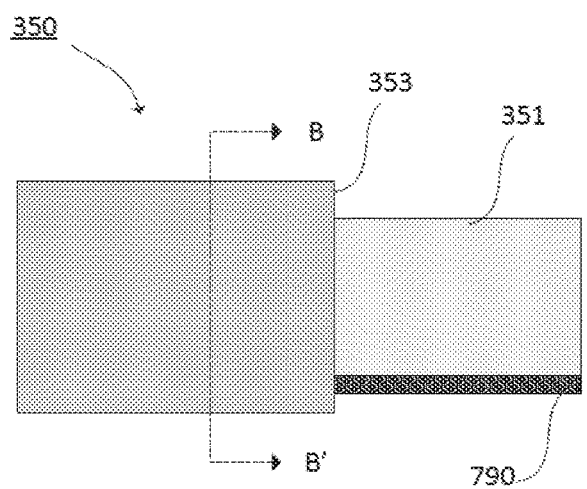
FIG. 7A is a cross-sectional illustration of a portion of a hybrid dielectric waveguide that includes a conductive line, according to an embodiment of the invention.
Figure 7B:
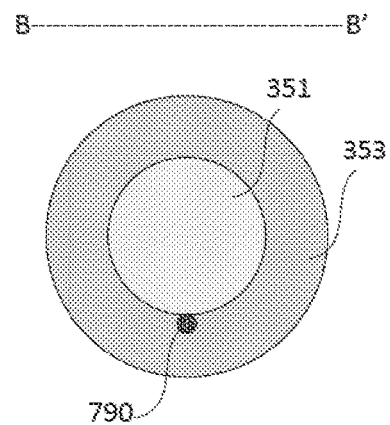
FIG. 7B is a cross-sectional illustration of the hybrid dielectric waveguide illustrated in FIG. 7A along line B-B', according to an embodiment of the invention.

In yet another embodiment of the invention, the power line may be integrated directly into the dielectric waveguide 350. An example of such an embodiment is illustrated in FIGS. 7A and 7B. In FIGS. 7A and 7B only the dielectric materials for the waveguide and the power line are shown for simplicity. However, it is to be appreciated that these dielectric waveguides may be integrated with any of the waveguide bundles described herein, or used individually.

Referring now to FIG. 7A, a dielectric waveguide 350 is illustrated that includes a first dielectric material 351 and a second dielectric material 353. In such an embodiment, a power line 790 may be integrated between the two dielectric materials. For example, the powerline may be integrated between the two dielectric materials during a co-extrusion process. Alternatively, the first dielectric material 351 and the power line 790 may be held together and the second dielectric material 353 may be printed or otherwise deposited around the two materials. While a conductive material for the power line 790 increases the overall weight of the dielectric waveguide 350, it is to be appreciated that the increased weight may not be significant since all dielectric waveguides in a waveguide bundle may not require the power line 790.

In additional embodiments of the invention, the power line may not be formed at the junction between a first dielectric material 351 and a second dielectric material 353, as shown in the cross-sectional illustration in FIG. 7B along line B-B'. For example, the power line 790 may be embedded within a single dielectric material. In such an embodiment, the second dielectric material may be omitted. Alternatively, the first dielectric material 351 and the second dielectric material 353 may be the same material. In yet another embodiment, a plurality of power lines 790 may be integrated into the dielectric waveguide 350 in order to allow for multiple different voltages to be supplied along a single dielectric waveguide 350.

Figure 8:
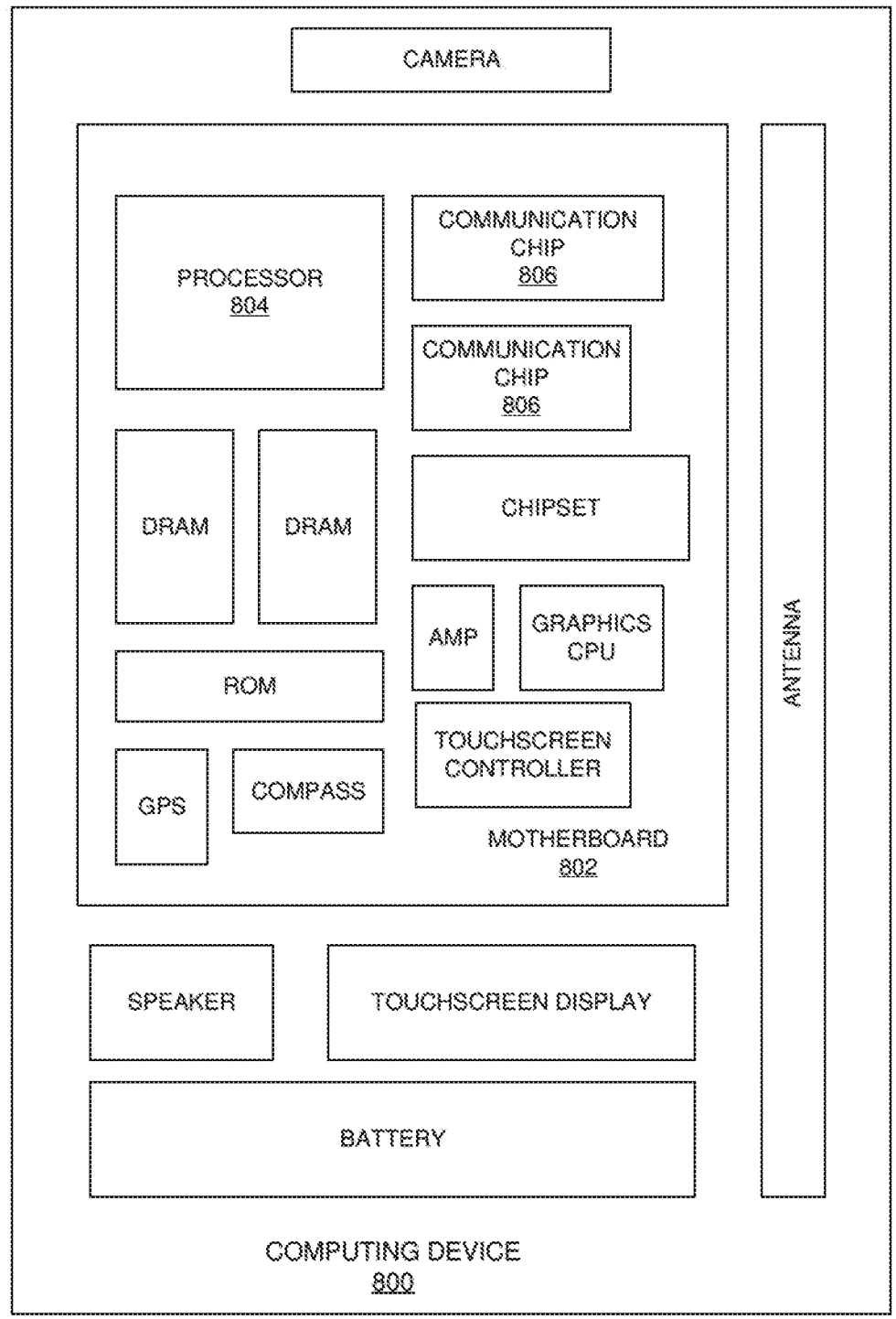
FIG. 8 is a schematic of a computing device built in accordance with an embodiment of the invention.

FIG. 8 illustrates a computing device 800 in accordance with one implementation of the invention. The computing device 800 houses a board 802. The board 802 may include a number of components, including but not limited to a processor 804 and at least one communication chip 806. The processor 804 is physically and electrically coupled to the board 802. In some implementations the at least one communication chip 806 is also physically and electrically coupled to the board 802. In further implementations, the communication chip 806 is part of the processor 804. In yet another implementation, the communication chip 806 may function as a predefined interface (e.g., a serializer/deserializer, or the like).

Depending on its applications, computing device 800 may include other components that may or may not be physically and electrically coupled to the board 802. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 806 enables wireless communications for the transfer of data to and from the computing device 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 806 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 800 may include a plurality of communication chips 806. For instance, a first communication chip 806 may be dedicated to shorter range wireless communications such as Wi-Fi and Bluetooth and a second communication chip 806 may be dedicated to longer range wireless communications such as GPS, EDGE, GPRS, CDMA, WiMAX, LTE, Ev-DO, and others.

The processor 804 of the computing device 800 includes an integrated circuit die packaged within the processor 804. In some implementations of the invention, the integrated circuit die of the processor may be packaged on an organic substrate and provide signals that are converted to a mmwave signal and propagated along a mm-wave interconnect with power over waveguide technology, in accordance with implementations of the invention. The term "processor" may refer to any device or portion of a device that processes electronic data from registers and/or memory to transform that electronic data into other electronic data that may be stored in registers and/or memory.

The communication chip 806 also includes an integrated circuit die packaged within the communication chip 806. In accordance with another implementation of the invention, the integrated circuit die of the communication chip may be packaged on an organic substrate and provide signals that are converted to a mm-wave signal and propagated along a mm-wave interconnect with power over waveguide technology, in accordance with implementations of the invention.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

The following examples pertain to further embodiments. The various features of the different embodiments may be variously combined with some features included and others excluded to suit a variety of different applications.

Example 1 is a waveguide bundle, comprising a plurality of dielectric waveguides. Each waveguide comprises a dielectric core and a conductive coating around the dielectric core; a power delivery layer formed around the plurality of dielectric waveguides; and an insulating jacket enclosing the waveguide bundle.

In example 2, the subject matter of example 1 can optionally include the power deliver layer is a braided shield.

In example 3, the subject matter of any of examples 1-2 can optionally include the braided shield provides at least one of a DC power line and an AC power line. One or more of the dielectric waveguides provide a DC ground over their conductive coatings. The AC power line does not use the braided shield as reference or ground.

In example 4, the subject matter of any of examples 1-3 can optionally include the power delivery layer separated from the plurality of dielectric waveguides by a braided shield, and wherein the power delivery layer is a power delivery braided foil.

In example 5, the subject matter of any of examples 1-4 can optionally include the power delivery braided foil is electrically isolated from the braided shield by an insulating layer.

In example 6, the subject matter of any of examples 1-5 can optionally include the power delivery braided foil provides a DC power line, and wherein the braided shield provides a DC ground.

In example 7, the subject matter of any of examples 1-6 can optionally include the power delivery braided foil is sectorized. The sectorized power delivery braided foil provides a plurality of DC power lines at different voltages.

In example 8, the subject matter of any of examples 1-7 can optionally include further comprising a plurality of braided shields. Each braided shield surrounds one of the dielectric waveguides.

In example 9, the subject matter of any of examples 1-8 can optionally include the power delivery layer as a global foil that surrounds the plurality of dielectric waveguides.

In example 10, the subject matter of any of examples 1-9 can optionally include the global foil provides a DC power line. One or more of the plurality of braided shields provides a DC ground.

In example 11, the subject matter of any of examples 1-10 can optionally include the power delivery layer as a power delivery braided foil.

In example 12, the subject matter of example 1 can optionally include further comprising a conductive line and a second insulating jacket around the conductive line.

Example 13 is a dielectric waveguide, comprising a dielectric core and a conductive layer surrounding the dielectric core. The conductive layer provides a power delivery pathway along the length of the dielectric waveguide.

In example 14, the subject matter of example 13 can optionally include the conductive layer as a conductive plating layer.

In example 15, the subject matter of any of examples 13-14 can optionally include the conductive layer as a foil wrapping layer.

In example 16, the subject matter of any of examples 13-15 can optionally include the foil wrapping layer formed over a conductive plating layer.

In example 17, the subject matter of any of examples 13-16 can optionally include the foil wrapping layer separated from the conductive plating layer by an insulative layer.

In example 18, the subject matter of any of examples 13-17 can optionally include the foil wrapping layer wrapped around the perimeter of the dielectric core a plurality of times.

In example 19, the subject matter of any of examples 13-18 can optionally include the foil wrapping layer wrapped around the dielectric core lengthwise.

In example 20, the subject matter of example 13 can optionally include the dielectric core includes a first dielectric material and a second dielectric material.

In example 21, the subject matter of any of examples 13-20 can optionally include further comprising a conductive line integrated within the dielectric core.

In example 22, the subject matter of any of examples 13-21 can optionally include the conductive line at the boundary between the first dielectric material and the second dielectric material.

In example 23, the subject matter of any of examples 13-22 can optionally include the conductive line embedded within the first dielectric material.

Example 24 is a vehicle, comprising an electronic control unit (ECU). The ECU comprises a printed circuit board (PCB); a central processing unit (CPU) die packaged on a CPU packaging substrate. The CPU packaging substrate is electrically coupled to the PCB; and an external predefined interface electrically coupled to the CPU die; a waveguide bundle. A first end of the waveguide bundle is communicatively coupled to the external predefined interface by a connector. The waveguide bundle comprises a plurality of dielectric waveguides. Each dielectric waveguide comprises a dielectric core and a conductive coating around the dielectric core; a power delivery layer formed around the plurality of dielectric waveguides; and an insulating jacket enclosing the waveguide bundle; and a sensor communicatively coupled to a second end of the waveguide bundle by a connector. The sensor is a video camera, a positioning system, an ultrasonic sensor, a radar sensor, or a light detection and ranging (LIDAR) sensor.

In example 25, the subject matter of example 24 can optionally include the waveguide bundle having a length between approximately 1 meter and 15 meters.

What is claimed is:

1. A waveguide bundle, comprising:
a plurality of dielectric waveguides, wherein each dielectric waveguide comprises a dielectric core and a conductive coating around the dielectric core;
a power delivery layer formed around the plurality of dielectric waveguides; and
an insulating jacket enclosing the waveguide bundle.

2. The waveguide bundle of claim 1, wherein the power delivery layer is a braided shield.

3. The waveguide bundle of claim 2, wherein the braided shield provides at least one of a DC power line and an AC power line, wherein one or more of the dielectric waveguides provide a DC ground over their conductive coatings, and wherein the AC power line does not use the braided shield as reference or ground.

4. The waveguide bundle of claim 1, wherein the power delivery layer is separated from the plurality of dielectric waveguides by a braided shield, and wherein the power delivery layer is a power delivery braided foil.

5. The waveguide bundle of claim 4, wherein the power delivery braided foil is electrically isolated from the braided shield by an insulating layer.

6. The waveguide bundle of claim 5, wherein the power delivery braided foil provides a DC power line, and wherein the braided shield provides a DC ground.

7. The waveguide bundle of claim 5, wherein the power delivery braided foil is sectorized, wherein the sectorized power delivery braided foil provides a plurality of DC power lines at different voltages.

8. The waveguide bundle of claim 1, further comprising a plurality of braided shields, wherein each braided shield surrounds one of the dielectric waveguides.

9. The waveguide bundle of claim 8, wherein the power delivery layer is a global foil that surrounds the plurality of dielectric waveguides.

10. The waveguide bundle of claim 9, wherein the global foil provides a DC power line, and wherein one or more of the plurality of braided shields provides a DC ground.

11. The waveguide bundle of claim 8, wherein the power delivery layer is a power delivery braided foil.

12. The waveguide bundle of claim 1, further comprising a conductive line and a second insulating jacket around the conductive line.

13. A dielectric waveguide, comprising:
a dielectric core including a first dielectric material and a second dielectric material;
a conductive line integrated within the dielectric core; and
a conductive layer surrounding the dielectric core, wherein the conductive layer provides a power delivery pathway along a length of the dielectric waveguide.

14. The dielectric waveguide of claim 13, wherein the conductive layer is a conductive plating layer.

15. The dielectric waveguide of claim 13, wherein the conductive layer is a foil wrapping layer.

16. The dielectric waveguide of claim 15, wherein the foil wrapping layer is formed over a conductive plating layer.

17. The dielectric waveguide of claim 16, wherein the foil wrapping layer is separated from the conductive plating layer by an insulative layer.

18. The dielectric waveguide of claim 15, wherein the foil wrapping layer is wrapped around a perimeter of the dielectric core a plurality of times.

19. The dielectric waveguide of claim 15, wherein the foil wrapping layer is wrapped around the dielectric core lengthwise.

20. The dielectric waveguide of claim 13, wherein first dielectric material is different than the second dielectric material.

21. The dielectric waveguide of claim 13, wherein a cross-sectional length of the conductive line is smaller than a cross-sectional length of the first dielectric material or a cross-sectional length of the second dielectric material.

22. The dielectric waveguide of claim 13, wherein the conductive line is at a boundary between the first dielectric material and the second dielectric material.

23. The dielectric waveguide of claim 21, wherein the conductive line is embedded within the first dielectric material or within the second dielectric material.

24. A vehicle, comprising:
an electronic control unit (ECU), wherein the ECU comprises:
a printed circuit board (PCB);
a central processing unit (CPU) die packaged on a CPU packaging substrate, wherein the CPU packaging substrate is electrically coupled to the PCB; and
an external predefined interface electrically coupled to the CPU die;
a waveguide bundle, wherein a first end of the waveguide bundle is communicatively coupled to the external predefined interface by a connector, and wherein the waveguide bundle comprises:
a plurality of dielectric waveguides, wherein each dielectric waveguide comprises a dielectric core and a conductive coating around the dielectric core;
a power delivery layer formed around the plurality of dielectric waveguides; and
an insulating jacket enclosing the waveguide bundle; and
a sensor communicatively coupled to a second end of the waveguide bundle by a connector, and wherein the sensor is a video camera, a positioning system, an ultrasonic sensor, a radar sensor, or a light detection and ranging (LIDAR) sensor.

25. The vehicle of claim 24, wherein the waveguide bundle has a length between approximately 1 meter and 15 meters.

26. A dielectric waveguide, comprising:
a dielectric core; and
a conductive layer surrounding the dielectric core, wherein the conductive layer provides a power delivery pathway along a length of the dielectric waveguide; and
a power line integrated within the dielectric core.

27. The dielectric waveguide of claim 26, wherein a cross-sectional length of the power line is smaller than a cross-sectional length of the dielectric core.

28. The dielectric waveguide of claim 26, wherein the dielectric core includes a first dielectric material and a second dielectric material.

29. The dielectric waveguide of claim 28, wherein the second dielectric material surrounds the first dielectric material.

30. The dielectric waveguide of claim 28, wherein the power line is integrated within the first dielectric material or within the second dielectric material.

31. The dielectric waveguide of claim 28, wherein the power line is at a boundary between the first dielectric material and the second dielectric material.

32. The dielectric waveguide of claim 26, wherein the power line is among a plurality of power lines integrated within the dielectric core.

33. The dielectric waveguide of claim 32, wherein at least one power line of the plurality of power lines is to provide a different voltage than at least one other power line of the plurality of power lines.

34. The dielectric waveguide of claim 32, wherein at least one power line of the plurality of power lines is to provide a same voltage as at least one other power line of the plurality of power lines.

35. The dielectric waveguide of claim 26, wherein the dielectric waveguide is among a plurality of dielectric waveguides of a waveguide bundle, and wherein:
- the plurality of dielectric waveguides is wrapped in a single braided shield layer or individual dielectric waveguides of the plurality of dielectric waveguides is wrapped in a respective braided shield layer, and
- the waveguide bundle is wrapped in a single insulating jacket.

* * * * *